United States Patent
Zhou et al.

(10) Patent No.: US 7,709,411 B2
(45) Date of Patent: May 4, 2010

(54) METHOD OF MANUFACTURING MULTICOMPONENT NANOPARTICLES

(75) Inventors: Bing Zhou, Cranbury, NJ (US); Sukesh Parasher, Lawrenceville, NJ (US); Michael Rueter, Plymouth Meeting, PA (US)

(73) Assignee: Headwaters Technology Innovation, LLC, Lawrenceville, NJ (US)

( * ) Notice: Subject to any disclaimer, the term of this patent is extended or adjusted under 35 U.S.C. 154(b) by 30 days.

(21) Appl. No.: 12/421,208

(22) Filed: Apr. 9, 2009

(65) Prior Publication Data

US 2009/0298684 A1 Dec. 3, 2009

Related U.S. Application Data

(60) Division of application No. 11/103,676, filed on Apr. 12, 2005, now abandoned, which is a continuation-in-part of application No. 10/990,616, filed on Nov. 17, 2004.

(51) Int. Cl.
| | |
|---|---|
| *B01J 25/00* | (2006.01) |
| *B01J 23/40* | (2006.01) |
| *B01J 23/42* | (2006.01) |
| *B01J 31/00* | (2006.01) |
| *C22C 38/00* | (2006.01) |
| *C22C 5/04* | (2006.01) |

(52) U.S. Cl. .............. 502/300; 502/326; 502/167; 502/166; 502/172; 502/173; 977/810; 420/82; 420/466

(58) Field of Classification Search ............... 502/167, 502/168, 172, 173, 300–355; 977/701, 777, 977/810; 420/8–127, 400–589
See application file for complete search history.

(56) References Cited

U.S. PATENT DOCUMENTS

| | | | |
|---|---|---|---|
| 3,625,879 A | 12/1971 | Horne et al. |
| 3,644,200 A | 2/1972 | Young |
| 3,674,706 A | 7/1972 | Box, Jr. et al. |
| 3,686,340 A | 8/1972 | Patrick et al. |
| 3,700,745 A | 10/1972 | Kovach et al. |
| 4,007,256 A | 2/1977 | Kim et al. |
| 4,028,274 A | 6/1977 | Kunz |
| 4,053,531 A | 10/1977 | Kerr et al. |
| 4,064,154 A | 12/1977 | Chandra et al. |
| 4,083,803 A | 4/1978 | Oswald et al. |
| 4,128,627 A | 12/1978 | Dyer et al. |
| 4,148,750 A | 4/1979 | Pine |
| 4,157,355 A | 6/1979 | Addison |
| 4,247,730 A | 1/1981 | Brunelle |
| 4,279,883 A | 7/1981 | Izumi et al. |
| 4,297,205 A | 10/1981 | Mieville |
| 4,335,092 A | 6/1982 | Dalton, Jr. et al. |
| 4,336,239 A | 6/1982 | Dalton, Jr. et al. |
| 4,336,240 A | 6/1982 | Moseley et al. |
| 4,347,231 A | 8/1982 | Michaelson |
| 4,347,232 A | 8/1982 | Michaelson |
| 4,366,085 A | 12/1982 | Ikegami et al. |
| 4,379,778 A | 4/1983 | Dalton, Jr. et al. |
| 4,454,240 A | 6/1984 | Ganguli |
| 4,476,242 A | 10/1984 | Puskas et al. |
| 4,503,160 A | 3/1985 | Williams, Jr. |
| 4,513,098 A | 4/1985 | Tsao |
| 4,595,666 A | 6/1986 | Ganguli |
| 4,701,428 A | 10/1987 | Bellussi et al. |
| 4,713,363 A | 12/1987 | Hucul |
| 4,793,980 A | 12/1988 | Torobin |
| 4,824,976 A | 4/1989 | Clerici et al. |
| 4,826,795 A | 5/1989 | Kitson et al. |
| 4,832,821 A | 5/1989 | Swan, III |
| 4,832,938 A | 5/1989 | Gosser et al. |

(Continued)

FOREIGN PATENT DOCUMENTS

EP     0 864 362     9/1998

(Continued)

OTHER PUBLICATIONS

Zhang et al. "Microemulsion synthesis and elctrocatalytic properties of platinum-cobalt nanoparticles", Journal of Materials Chemistry, 2002, 12, 1203-1206.*

(Continued)

*Primary Examiner*—Steven Bos
*Assistant Examiner*—Anthony J Zimmer
(74) *Attorney, Agent, or Firm*—Workman Nydegger

(57) ABSTRACT

Multicomponent nanoparticles include two or more dissimilar components selected from different members of the group of noble metals, base transition metals, alkali earth metals, and rare earth metals and/or different groups of the periodic table of elements. The two or more dissimilar components are dispersed using a polyfunctional dispersing agent such that the multicomponent nanoparticles have a substantially uniform distribution of the two or more dissimilar components. The polyfunctional dispersing agent may include organic molecules, polymers, oligomers, or salts of these. The molecules of the dispersing agent bind to the dissimilar components to overcome same-component attraction, thereby allowing the dissimilar components to form multicomponent nanoparticles. Dissimilar components such as iron and platinum can be alloyed together using the dispersing agent to form substantially uniform multicomponent nanoparticles, which can be used alone or with a support. At least a portion of the dispersing agent is removed by reduction and/or oxidation.

19 Claims, No Drawings

U.S. PATENT DOCUMENTS

| | | |
|---|---|---|
| 4,937,216 A | 6/1990 | Clerici et al. |
| 4,937,220 A | 6/1990 | Nickols, Jr. |
| 4,983,558 A | 1/1991 | Born et al. |
| 4,999,326 A | 3/1991 | Sikkenga et al. |
| 5,017,535 A | 5/1991 | Schoonhoven et al. |
| 5,024,905 A | 6/1991 | Itoh et al. |
| 5,061,671 A | 10/1991 | Kitson et al. |
| 5,096,866 A | 3/1992 | Itoh et al. |
| 5,104,635 A | 4/1992 | Kanada et al. |
| 5,128,114 A | 7/1992 | Schwartz |
| 5,132,099 A | 7/1992 | Hiramatsu et al. |
| 5,132,480 A | 7/1992 | Tsutsui et al. |
| 5,166,372 A | 11/1992 | Crocco et al. |
| 5,180,573 A | 1/1993 | Hiramatsu et al. |
| 5,188,996 A | 2/1993 | Huang et al. |
| 5,214,168 A | 5/1993 | Zajacek et al. |
| 5,234,584 A | 8/1993 | Birbara et al. |
| 5,236,692 A | 8/1993 | Nagashima et al. |
| 5,320,821 A | 6/1994 | Nagashima et al. |
| 5,338,531 A | 8/1994 | Chuang et al. |
| 5,352,645 A | 10/1994 | Schwartz |
| 5,372,981 A | 12/1994 | Witherspoon |
| 5,378,450 A | 1/1995 | Tomita et al. |
| 5,391,531 A | 2/1995 | Ward |
| 5,399,344 A | 3/1995 | Yang et al. |
| 5,480,629 A | 1/1996 | Thompson et al. |
| 5,496,532 A | 3/1996 | Monzen et al. |
| 5,505,921 A | 4/1996 | Luckoff et al. |
| 5,583,085 A | 12/1996 | Ward |
| 5,698,488 A | 12/1997 | Birbara et al. |
| 5,767,036 A | 6/1998 | Freund et al. |
| 5,846,895 A | 12/1998 | Gila et al. |
| 5,846,898 A | 12/1998 | Chuang et al. |
| 5,851,948 A | 12/1998 | Chuang et al. |
| 5,859,265 A | 1/1999 | Muller et al. |
| 5,866,500 A | 2/1999 | Taguchi et al. |
| 5,885,443 A | 3/1999 | Bogdan et al. |
| 5,900,386 A | 5/1999 | Freund et al. |
| 5,912,367 A | 6/1999 | Chang |
| 5,925,588 A | 7/1999 | Chuang et al. |
| 5,961,948 A | 10/1999 | Wanngard |
| 5,965,101 A | 10/1999 | Goto et al. |
| 5,972,305 A | 10/1999 | Park et al. |
| 5,976,486 A | 11/1999 | Thompson et al. |
| 6,001,762 A | 12/1999 | Harmer et al. |
| 6,005,155 A | 12/1999 | Sun |
| 6,040,490 A | 3/2000 | Ichioka et al. |
| 6,054,507 A | 4/2000 | Funaki et al. |
| 6,069,286 A | 5/2000 | Wu et al. |
| 6,090,858 A | 7/2000 | El-Sayed |
| 6,106,797 A | 8/2000 | Muller et al. |
| 6,127,307 A | 10/2000 | Muller et al. |
| 6,159,267 A | 12/2000 | Hampden-Smith et al. |
| 6,168,775 B1 | 1/2001 | Zhou et al. |
| 6,194,338 B1 | 2/2001 | Andolfatto et al. |
| 6,239,054 B1 | 5/2001 | Skukis et al. |
| 6,284,213 B1 | 9/2001 | Paparatto et al. |
| 6,331,500 B1 | 12/2001 | Tsuji et al. |
| 6,387,346 B1 | 5/2002 | Bertsch-Frank et al. |
| 6,447,743 B1 | 9/2002 | Devic et al. |
| 6,500,968 B2 | 12/2002 | Zhou et al. |
| 6,500,969 B1 | 12/2002 | Zhou et al. |
| 6,518,217 B2 | 2/2003 | Xing et al. |
| 6,528,683 B1 | 3/2003 | Heidemann et al. |
| 6,534,440 B2 | 3/2003 | Choudhary et al. |
| 6,534,661 B1 | 3/2003 | Zhou et al. |
| 6,551,960 B1 | 4/2003 | Laine et al. |
| 6,576,214 B2 | 6/2003 | Zhou et al. |
| 6,630,118 B2 | 10/2003 | Paparatto et al. |
| 6,635,348 B1 | 10/2003 | Hampden-Smith et al. |
| 6,649,140 B2 | 11/2003 | Paparatto et al. |
| 6,676,919 B1 | 1/2004 | Fischer et al. |
| 6,713,036 B1 | 3/2004 | Vanden Bussche et al. |
| 6,727,309 B1 | 4/2004 | Paiva et al. |
| 6,740,615 B2 | 5/2004 | Zhou |
| 6,746,597 B2 | 6/2004 | Zhou et al. |
| 6,776,606 B2 | 8/2004 | Haskew |
| 6,782,892 B2 | 8/2004 | Li et al. |
| 6,888,013 B2 | 5/2005 | Paparatto et al. |
| 7,011,807 B2 | 3/2006 | Zhou et al. |
| 7,045,479 B2 | 5/2006 | Zhou et al. |
| 7,045,481 B1 | 5/2006 | Parasher et al. |
| 7,235,228 B2 * | 6/2007 | Carpenter et al. .......... 424/9.32 |
| 7,407,527 B2 * | 8/2008 | Hyeon .......... 75/351 |
| 2001/0024634 A1 | 9/2001 | Bertsch-Frank et al. |
| 2002/0022672 A1 | 2/2002 | Thunhorst et al. |
| 2003/0010252 A1 * | 1/2003 | Arita et al. .......... 106/31.27 |
| 2003/0012686 A1 | 1/2003 | Andersen et al. |
| 2003/0086853 A1 | 5/2003 | Devic |
| 2003/0104936 A1 | 6/2003 | Mao et al. |
| 2003/0121364 A1 * | 7/2003 | Sun .......... 75/362 |
| 2003/0215383 A1 | 11/2003 | Escrig et al. |
| 2004/0013601 A1 | 1/2004 | Butz et al. |
| 2004/0037769 A1 | 2/2004 | Paparatto et al. |
| 2004/0037770 A1 | 2/2004 | Fischer et al. |
| 2004/0081611 A1 | 4/2004 | Muller et al. |
| 2004/0087441 A1 | 5/2004 | Bock et al. |
| 2004/0102648 A1 | 5/2004 | Borgmeier et al. |
| 2004/0151659 A1 | 8/2004 | Paparatto et al. |
| 2004/0151660 A1 | 8/2004 | Paparatto et al. |
| 2004/0184983 A1 | 9/2004 | Paparatto et al. |
| 2004/0241502 A1 | 12/2004 | Chung |
| 2005/0014636 A1 | 1/2005 | Zhou et al. |
| 2006/0102521 A1 | 5/2006 | Zhou et al. |
| 2006/0243641 A1 | 11/2006 | Zhou et al. |
| 2008/0045401 A1 | 2/2008 | Zhou et al. |

FOREIGN PATENT DOCUMENTS

| | | |
|---|---|---|
| EP | 0 978 316 | 2/2000 |
| EP | 1 277 701 | 7/2002 |
| EP | 1 344 747 | 9/2003 |
| JP | 07069605 | 3/1995 |
| JP | 10324507 | 12/1998 |
| JP | 03024794 | 1/2003 |
| WO | WO 98/10863 | 3/1998 |
| WO | WO 00/59635 | 10/2000 |
| WO | WO 01/05501 | 1/2001 |
| WO | WO 02/14217 | 2/2002 |
| WO | WO 02/083550 | 10/2002 |
| WO | WO 02/092501 | 11/2002 |
| WO | WO 02/092502 | 11/2002 |
| WO | WO 03/014014 | 2/2003 |
| WO | WO 2006/078352 | 7/2006 |

OTHER PUBLICATIONS

Nashner et al. "Structural Characterization of Carbon-Supported Platinum-Ruthenium Nanoparticles from the Molecular cluster Precursor PtRu5C(CO)16" Journal of the American Chemical Society, 1997, 119, 7760-7771.*

Sun et al. "Monodisperse FePt Nanoparticles and Ferromagnetic FePt Nanocrystal Superlattices", Mar. 17, 2000, Science, vol. 287, pp. 1989-1992.*

Bönnemann et al. "Nanoscale colloidal metals and alloys stabilized by solvents and surfactants Preparation and use as catalyst precursors", Journal of Organometallic Chemistry 520 (1996) 143-162.*

Kim et al. "Preparation and characterization of Au-Ag and Au-Cu alloy nanopartices in chloroform", Journal of Materials Chemistry, 2003, 13, 1789-1792.*

Scott et al., "Interaction between ruthenium and molybdenum in RuMo/Al$_2$O$_3$ catalysts", Applied Catalysis A: General 125 (1995) 71-79.

Adesina, "Hydrocarbon synthesis via Fischer-Tropsch reaction: travails and triumphs", Applied Catalysis A: General 138 (1996) 345-367.

Aksoylu et al., "Interaction between nickel and molybdenum in Ni-Mo/Al$_2$O$_3$ catalysts: II CO hydrogenation", Applied Catalysis A: General 168 (1998) 399-407.

Aksoylu et al., "Interaction between nickel and molybdenum in Ni-Mo/Al$_2$O$_3$ catalysts: III. Effect of impregnation strategy", Applied Catalysis A: General 183 (1999) 357-364.

Zhu et al., "Catalytic partial oxidation of methane to synthesis gas over Ni-CeO$_2$", Applied Catalysis A: General 208 (2001) 403-417.

Morioka et al., "Partial oxidation of methane to synthesis gas over supported Ni catalysts prepared from Ni-Ca/Al-layered double hydroxide", Applied Catalysis A: General 215 (2001) 11-19.

Chu et al., "The partial oxidation of methane to syngas over the nickel-modified hexaaluminate catalysts BaNi$_y$Al$_{12-y}$O$_{19-\delta}$", Applied Catalysis A: General 235 (2002) 39-45.

Basile et al., "Rh-Ni synergy in the catalytic partial oxidation of methane: surface phenomena and catalyst stability", Catalysis Today 77 (2002) 215-223.

Te et al., "Comparative study of Rh/Al$_2$O$_3$ and Rh-Mo/Al$_2$O$_3$ catalysts", Center for Catalytic Science and Technology, Abstract, Oct. 4, 1994.

Lowenthal et al., "Surface Chemistry of Rh-Mo/$\gamma$-Al$_2$O$_3$: An Analysis of Surface Acidity," Journal of Catalysis 156, 96-105 (1995).

Ahmadi et al., "Shape-Controlled Synthesis of Colloidal Platinum Nanoparticles", Science, vol. 272, Jun. 28, 1996, pp. 1924-1926.

Nashner et al., "Structural Characterization of Carbon-Supported Platinum-Ruthenium Nanoparticles from the Molecular Cluster Precursor PtRu$_5$C(CO)$_{16}$", Journal of the American Chemical Society, 1997, 119, 7760-7771.

Sun et al., "Monodisperse FePt Nanoparticles and Ferromagnetic FePt Nanycrystal Superlattices", Mar. 17, 2000, Science, vol. 287, pp. 1989-1992.

Bonnemann et al., "Nanoscale colloidal metals and alloys stabilized by solvents and surfactants Preparation and use as catalyst precursors", Journal of Organometallic Chemistry 520 (1996), 143-162.

Kim et al., "Preparation and characterization of Au-Ag and Au-Cu alloy nanoparticles in chloroform", Journal of Materials Chemistry, 2003, 13, 1789-1792.

Li et al., "Carbon Nanotubes as Support for Cathode Catalyst of a Direct Methanol Fuel Cell", Letters to the Editor/Carbon 40, Dalian University of Technology, pp. 787-803 (Jan. 18, 2002).

Li et al., "Preparation and Characterization of Multi-Walled Carbon Nanotube-Supported Platinum for Cathode Catalysts of Direct Methanol Fuel Cells", J. Phys. Chem., B, vol. 107, pp. 6292-6299 (Jun. 6, 2003).

Lordi et al., "Method for Supporting Platinum on Single-Walled Carbon Nanotubes for a Selective Hydrogenation Catalyst", Chem. Mater., vol. 13, pp. 733-737 (Feb. 10, 2001).

Zhou et al., "Novel Synthesis of Highly Active Pt/C Cathode Electrocatalyst for Direct Methanol Fuel Cell", Chem. Commun. 2003, pp. 394-395 .

Zhou et al., "Preparation and Characterization of anode catalysts Pt/Ru/C for Direct Methanol Fuel Cells", Chemical Journal of Chinese Universities, vol. 24, 2003, pp. 885-862.

Office Action dated Aug. 8, 2007 cited in U.S. Appl. No. 11/435,165.
Office Action dated Jan. 9, 2008 cited in U.S. Appl. No. 11/435,165.
Office Action dated Feb. 6, 2008 cited in U.S. Appl. No. 11/435,165.
Office Action dated May 30, 2008 cited in U.S. Appl. No. 11/435,165.
Office Action dated Feb. 2, 2009 cited in U.S. Appl. No. 11/435,165.
Office Action dated Mar. 27, 2008 cited in U.S. Appl. No. 10/990,616.
Office Action dated Jul. 18, 2008 cited in U.S. Appl. No. 10/990,616.
Office Action dated Dec. 17, 2008 cited in U.S. Appl. No. 10/990,616.
Office Action dated Mar. 27, 2008 cited in U.S. Appl. No. 11/103,676.
Office Action dated Aug. 13, 2008 cited in U.S. Appl. No. 11/103,676.
Office Action dated Dec. 5, 2008 cited in U.S. Appl. No. 11/103,676.
Office Action dated Mar. 21, 2008 cited in U.S. Appl. No. 11/101,241.
Office Action dated Aug. 19, 2008 cited in U.S. Appl. No. 11/101,241.
Office Action dated Jan. 9, 2009 cited in U.S. Appl. No. 11/101,241.
Notice of Allowance dated Apr. 10, 2009 in U.S. Appl. No. 11/101,241.
Office Action dated Jun. 24, 2008 cited in U.S. Appl. No. 11/435,580.
Notice of Allowance dated Jan. 30, 2009 in U.S. Appl. No. 11/435,580.
Search Report from PCT/US05/42841.
Notice of Allowance dated Aug. 14, 2009 in U.S. Appl. No. 10/990,616.

* cited by examiner

METHOD OF MANUFACTURING MULTICOMPONENT NANOPARTICLES

CROSS-REFERENCE TO RELATED APPLICATION

This application is a division of copending U.S. application Ser. No. 11/103,676, filed Apr. 12, 2005, which is a continuation-in-part of U.S. application Ser. No. 10/990,616, filed Nov. 17, 2004, the disclosures of which are incorporated herein in their entirety.

BACKGROUND OF THE INVENTION

1. The Field of the Invention

The invention is in the field of nanoparticles and/or catalysts that incorporate such nanoparticles. More particularly, the present invention relates to multi-component nanoparticles made using a dispersing agent that helps bring together and distribute different (e.g., dissimilar) components within the nanoparticles.

2. The Relevant Technology

Nanoparticles are becoming increasingly more important in many industrial processes and products. Nanoparticles find use in a variety of applications, including catalysis and nanomaterials. Catalytic applications include uses for both supported and unsupported nanoparticles of various components, including precious metals, base metals, and oxides. Nanomaterial applications include uses for light blocking, pigmentation, UV absorption, antimicrobial activity, chemical mechanical polishing, and others.

While useful nanoparticles may include only a single component (element or compound), it may be the case that advantageous properties can be achieved if the nanoparticles were to contain two or more distinct components to form a multi-component nanoparticle. In general, combinations of two or more metals can have a variety of beneficial effects. In the case of catalysts, the use of different elements can modify the catalytic activity to improve an important performance parameter such as activity or selectivity, or they may make the catalyst particle or crystal more resistant to some deleterious effect, such as chemical poisoning or mechanical attrition. In the case of nanomaterials, the inclusion of two or more components would be expected to add additional functionality to the particles, such as combining light blocking function with UV absorption or anti-microbial activity. Alternatively, additional components might be expected to stabilize or strengthen the nanoparticles.

While there is a strong motivation for producing multicomponent nanoparticles, it is difficult, if not impossible, to manufacture particles that contain two or more dissimilar components. This problem is particularly true of small nanoparticles. Recently, academia and industry have made significant advancements toward making very small particles. In some cases, the sizes of the particles are near or below 1 nanometer.

While nanometer sized particles are very advantageous for producing desired properties such as increased catalytic activity and unique material properties, the very smallness of such particles makes it difficult, if not impossible, to create multicomponent nanoparticles that include dissimilar components or elements within the same nanoparticle. One reason for this difficulty is that similar or like elements or compounds have a greater affinity for each other than to dissimilar materials. This same-component attraction means each component has a propensity to combine and form particles with itself rather than forming a mixture with other, dissimilar components. As a result, multicomponent nanoparticle mixtures are largely heterogeneous, composed of two or more distinct particle compositions, each relatively rich in one component and largely depleted or devoid of the other dissimilar components.

In general, the composition of particles, including the distribution of different components among and between the particles, is driven by thermodynamics. The chance of finding multiple components in any given particle depends to a large extent on the size of the particles being formed. When the particles are relatively large, the probability is higher that two dissimilar components can be compounded within a single particle and/or form an alloy. As the size of the particles decreases, however, the likelihood of finding multiple components within a single particle decreases dramatically. At the nanometer scale, it is virtually impossible to consistently and predictably compound two or more dissimilar elements within a single nanoparticle using known procedures. Small nanoparticles tend to be all of one component or another.

Part of the problem with forming multicomponent nano-sized particles is that conventional methods used to form nano-sized particles are performed at relatively low temperatures since high temperatures can causes nanoparticles to undesirably sinter or agglomerate together to form larger particles. Unfortunately, at such low temperatures, the thermodynamics of nanoparticle formation favors formation of single-component particles, as described above. On the other hand, raising the temperature sufficiently to overcome thermodynamic barriers to multicomponent formation causes agglomeration of smaller to larger particles. Consequently, conventional particle formation methods are not able to form nano-sized particles in which a substantial portion of the nanoparticles contain two or more components in each particle.

Another factor that significantly affects the uniformity of multicomponent particles is the dissimilarity of the components. For example, two noble metals such as palladium and platinum are typically more easily combined together within particles because their electronic and chemical properties are similar. In contrast, a noble metal such as platinum and a base metal such as iron have different electronic and chemical properties and are thus much more difficult, if not impossible, to compound together in a single nanoparticle using conventional manufacturing methods. In many cases, compounding dissimilar components does not produce a viable nanoparticle system because of the lack of uniformity in the distribution of the components throughout the nanoparticles. This is particularly true in the case of catalyst particles that require both catalyst components to be in close proximity and/or to be alloyed together to generate the desired catalytic activity.

R. W. J. Scott et al., JACS Communications, 125 (2003) 3708, state: "... at present there are no methods for preparing nearly monodisperse, bimetallic nanoparticles that are catalytically active...." X. Zhang and K. Y. Chan, Chem. Mater., 15 (2003) 451, teach: "A number of techniques have been used for producing nanoparticles, including vapor phase techniques, sol-gel methods, sputtering, and coprecipitation. The synthesis of mixed metal nanoparticles is attracting a lot of recent interest for their catalytic properties.... The synthesis of mixed metal nanoparticles is a complex problem because of the composition control in addition to size and size distribution control. Platinum-ruthenium bimetallic catalysts have been prepared by co-impregnation methods but without good control of particle size, particle size distribution, and chemical composition." R. W. J. Scott et al., JACS Communications 127 (2005),1380, disclose: "Most other methods for preparing supported bimetallic nanoparticles in the <5 nm size range lead to phase segregation of the two metals and thus poor control over the composition of individual particles." K. Hiroshima et al., Fuel Cells, 2 (2002) 31, teach: "The preparation of a highly dispersed alloy catalyst typically requires heat treatment, which is necessary to form an alloy but promotes particle aggregation. As a result, alloy catalysts usually have lower surface areas."

Therefore, what are needed are multicomponent nanoparticles that include different components that are more evenly dispersed among the particles. Furthermore, what is needed are compositions and processes that can be used to bring together and compound different (e.g., dissimilar) components together in individual nanoparticles without destroying the nanometer size of the particles.

BRIEF SUMMARY OF THE INVENTION

The present invention relates to nanoparticle compositions that overcome the limitations of the prior art by providing "nano" sized particles that are composed of two or more components in a desired distribution. During manufacture, a dispersing agent binds the two or more components and maintains them in close proximity during nanoparticle formation in order to control the arrangement and/or distribution of the components in the nanoparticle material.

In an exemplary embodiment, the multicomponent compositions of the present invention include a plurality of nanoparticles having a size less than about 100 nm. According to one embodiment, the plurality of nanoparticles includes at least two dissimilar nanoparticle components selected from different ones of the following groups: noble metals, base transition metals, alkali metals, alkaline earth metals, rare earth metals, and nonmetals. In an alternative embodiment, the multicomponent composition is made from two dissimilar nanoparticle components selected from two or more different groups of the periodic table of elements. The components that form the nanoparticles can be elements or compounds such as elemental metals or metal oxides.

Preferably, at least about 50% of the nanoparticles include two or more dissimilar components. More preferably, at least about 75% of the nanoparticles include two or more dissimilar components, even more preferably at least about 85% of the nanoparticles include two or more dissimilar components, and most preferably at least about 95% of the nanoparticles include two or more dissimilar components. It is within the scope of the invention for at least about 99% (or essentially all) of the nanoparticles to include two or more dissimilar components.

The present invention also includes a method to produce the uniform multicomponent nanoparticles. In general, the process includes preparing first and second solutions of dissimilar components and mixing them together with a dispersing agent to form a component complex. The molecules of the dispersing agent bind to at least a portion of the molecules of the first and second components to sufficiently overcome the same-component attractions such that the components can be arranged randomly or according to the molecular arrangement of the dispersing agent within the suspension. In some cases the component complex forms a suspension of nanoparticles. In other cases, the component complex is a precursor to the formation of nanoparticles (e.g., which may be formed by attaching the component complex to a support and/or removing at least a portion of the dispersing agent from the component complex).

In one embodiment, a suspension of nanoparticles can be used as an active catalyst while remaining in suspension form. In another embodiment, the nanoparticles can be attached to or formed on a solid support by suitable impregnation or attachment methods. The nanoparticles can also be separated from some or all of the liquid to form a concentrate of nanoparticles or a dry powder. As needed, the suspension can be chemically modified to stabilize the nanoparticles (e.g., prevent agglomeration), adjust pH, or otherwise adjust composition to suit an end use application. In one embodiment, the nanoparticles can be isolated by removing the dispersing agent from the nanoparticles, such as under reducing conditions (e.g., by reducing under $H_2$ gas or using strong reducing catalysts such as lithium aluminum hydride, sodium hydride, sodium borohydride, sodium bisulfite, sodium thiosulfate, hydroquinone, methanol, aldehydes, and the like, or by oxidation such as by using molecular oxygen, hydrogen peroxide, organic peroxides, and the like).

In an exemplary embodiment, the nanoparticles of the present invention are also of a substantially uniform size such that the particle size distribution (or deviation) is extremely narrow. The substantially uniform particle size distribution produces a nanoparticle material with more consistent properties and activity throughout the material.

The nanoparticles and methods of the present invention provide many advantages for making novel nanomaterials such as catalysts and/or for improving the activity and performance of existing nanomaterials. Novel nanomaterials are possible because dissimilar components, which typically do not form uniform particles, can be combined using one or more dispersing agents such that most or all of the particles have the two or more components in each particle. Because each nanoparticle contains a mixture or alloy of the two or more components, each nanoparticle has the intended or desired characteristic needed to produce the properties of the multicomponent material.

Unlike the nanoparticles of the prior art, the dissimilar components in the nanoparticles of the present invention are evenly dispersed among the nanoparticles. The dispersing agent overcomes the tendency for like components to agglomerate and form homogeneous particles but instead helps form multicomponent particles. In many cases, the functionality of the material depends on forming heterogeneous (i.e., multicomponent) particles rather than forming a heterogeneous mixture of homogeneous (i.e., single component) particles, as is typically seen in the prior art. The proper dispersing and mixing of the two or more components according to the present invention imparts beneficial characteristics, such as those described above.

Another advantage of the present invention is that the dispersing agents are readily available and relatively inexpensive. Still another advantage of the inventive process is that it is highly flexible in that it works well with a variety of components and thus can be used to improve many new and existing catalysts and nanomaterials. Furthermore, existing and novel catalysts can be stabilized thereby providing opportunities to use the nanoparticles in new processes or improve the resistance of the nanoparticles to degradation.

These and other advantages and features of the present invention will become more fully apparent from the following description and appended claims as set forth hereinafter.

DETAILED DESCRIPTION OF EXEMPLARY EMBODIMENTS

I. Introduction and Definitions

The present invention is directed to nanoparticles and nanoparticle materials made from two or more different components. The multicomponent nanoparticles are formed using a dispersing agent. In an exemplary embodiment, the dispersing agent binds to the components and determines in part the molecular arrangement of the components. The dispersing agent is able to ensure that two or more different components are distributed between and among nanoparticles in a desired distribution. Nanoparticles according to the invention can be used as catalysts with improved and/or novel catalytic activity and/or to form nanomaterials having superior properties.

For purposes of this invention, the term "nanoparticles" or "nano-sized particles," means particles with a diameter of less than about 100 nanometers (nm).

The term "component complex" refers to a solution, colloid, or suspension in which a bond or coordination complex is formed between a dispersing agent and one or more different types of particle atoms. The "bond" between the control agent and particles atoms can be ionic, covalent, electrostatic, or it can involve other bonding forces such as coordination with nonbonding electrons, van der Waals forces, and the like.

The term "minority component" means the component in a multicomponent nanoparticle with the lesser concentration within the particle. In the case where two or more components have essentially the same concentration within the particle, evidenced by the fact that the determination of a minority is statistically impractical, then either component is considered to be the minority component.

For purposes of disclosure and the appended claims, the term "Number Ratio" or "NR" is equal to $N_A/N_B$ where $N_A$ is the number (or moles) of atoms of a more numerous component A in a given nanoparticle or set of nanoparticles, and $N_B$ is the number (or moles) of atoms of a less numerous component B in the nanoparticle or set of nanoparticles. For a particular nanoparticle i, NR can be expressed as the specific value ($NR^i$). The average NR for all of the nanoparticles in a given set of nanoparticles is expressed as the average value ($NR^{avg}$).

In most cases, the individual NR values corresponding to the various particles within a given sample or set of nanoparticles do not equal a single discrete value but fall within a range of NR values (i.e., the "Range of NR"). The Range of NR for a given sample of set of nanoparticles having at least two different nanoparticle components within each particle has an upper value $NR^{max}$ and a lower value $NR^{min}$.

II. Multicomponent Nanoparticle Compositions

A. Nanoparticle Forming Component Complexes

As discussed above, two or more dissimilar atoms, molecules or components are joined together into multicomponent nanoparticles by means of a dispersing agent. The dissimilar components and the dispersing agent form one or more types of component complexes from which the multicomponent nanoparticles are formed. Thus, component complexes include one or more different types of component atoms complexed with one or more different types of dispersing agents. When so complexed, the component atoms are arranged in such a manner that the components either (i) form dispersed nanoparticles in solution or (ii) that upon or after contact with a support, the component complex forms dispersed nanoparticles. In either case, the dispersing agent can form a component complex to produce nanoparticles that are dispersed, stable, uniform, and/or desirably sized. In the case where the component complex has not yet resulted in the formation of nanoparticles, it may be proper to refer to this complex as a nanoparticle-forming intermediate complex.

1. Particle Component Atoms or Molecules

Any two or more elements or groups of elements that can form catalysts or nanomaterials can be used to form component complexes according to the present invention. As the primary component, metals or metal oxides are preferred. Exemplary metals can include base transition metals, rare earth metals, noble metals, and rare earth metals. Nanoparticles may also comprise non-metal atoms, alkali metals and alkaline earth metals. A catalyst compound comprising two or more different types of atoms is referred to as a molecule. Where catalytic activity is desired, elements or groups of elements can be selected that exhibit primary catalytic activity, as well as promoters and modifiers.

Examples of base transition metals include, but are not limited to, chromium, manganese, iron, cobalt, nickel, copper, zirconium, tin, zinc, tungsten, titanium, molybdenum, vanadium, and the like. These can be used in various combinations with each other, and/or in combinations with other different and/or dissimilar metals such as noble metals, alkali metals, alkaline earth metals, rare earth metals, or non-metals.

Molecules such as ceramics and metal oxides can also be used in the nanoparticles of the present invention. Examples include iron oxide, vanadium oxide, aluminum oxide, silica, titania, yttria, zinc oxide, zirconia, cerium oxide, and the like.

Examples of noble metals, also referred to as precious metals, include platinum, palladium, iridium, gold, osmium, ruthenium, rhodium, rhenium, and the like. Noble metals can be used in combination with other different and/or dissimilar elements, such as base transition metals, alkali metals, alkaline earth metals, rare earth metals, or non-metals.

Examples of rare earth metals include, but are not limited to, lanthanum and cerium. These can be used alone, in various combinations with each other, and/or in combinations with other different and/or dissimilar elements, such as base transition metals, noble metals, alkali metals, alkaline earth metals, or non-metals.

Examples of non-metals include, but are not limited to, phosphorus, oxygen, sulfur, antimony, arsenic, and halides, such as chlorine, bromine and fluorine. At least some of the foregoing are typically included as functionalizing agents for one or more metals, such as those listed above.

When added to an appropriate solvent or carrier to form a suspension, as described below, component atoms can be added in elemental form; however, the component atoms are typically in ionic form so as to more readily dissolve or disperse within the solvent or carrier. For example, metal components can be added in the form of salts or other compounds. Components that are compounds themselves, such as oxides, can be added to a liquid medium in the appropriate compound form, or may be in a different chemical form that is converted to the appropriate chemical form during nanoparticle formation. In the case of a metallic component, the atoms may be in the form of a metal halide, nitrate or other appropriate salt that is readily soluble in the solvent or carrier, e.g., metal phosphates, sulfates, tungstates, acetates, citrates, or glycolates.

2. Dissimilar Components

In an exemplary embodiment, the nanoparticles of the present invention include two or more dissimilar components. Two components are dissimilar where the unique electronic configuration of each component creates same-component attractions that, absent a dispersing agent according to the present invention, significantly affect or dominate the thermodynamics of particle formation and/or arrangement. For example, iron is dissimilar from platinum. When forming nanoparticles of platinum and iron using conventional methods, most, if not all, of the platinum atoms form homogeneous particles with other platinum atoms, and most, if not all, of the iron atoms form homogeneous particles with other iron atoms. Absent the use of a dispersing agent according to the present invention, the dissimilarity of iron and platinum atoms creates same-component attractions that predominate over other thermodynamic forces during particle formation or arrangement. The result is generally a heterogeneous mixture of largely homogeneous nanoparticles. In contrast, the use of one or more dispersing agents as disclosed herein overcomes such thermodynamic barriers and causes dissimilar components to be compounded together so as to yield multicomponent nanoparticles that include two or more dissimilar components in each of a substantial portion, if not essentially all, of the nanoparticles.

According to one embodiment, the dissimilar components comprise one or more components selected from each of at least two groups comprising (i) noble metals, (ii) base transition metals, (iii) alkali metals, (iv) alkaline earth metals, (v) rare earth metals, and (vi) non metals. That is, the dissimilar components according to this embodiment comprise at least one component (a) selected from one of groups (i)-(vi) and at least one other component (b) selected from at least one other of groups (i)-(vi).

In an alternative embodiment, dissimilar components are selected from different groups of the periodic table of elements (i.e., different columns of the periodic table). The dissimilar components according to this embodiment comprise at least one component (a') selected from one column of the periodic table and at least one other component (b') selected from at least one other column of the periodic table. Components selected from different groups of the periodic table are often dissimilar because of the difference in the number of valence electrons. As a non-limiting example of components formed from different groups of the periodic table, uniform nanoparticles may be composed of a mixture of titania and zinc oxide.

It is within the scope of the invention for the dissimilar components to comprise different base transition metals. Although sometimes categorized together for simplicity, different base transition metals often exhibit dissimilar properties. These dissimilarities often create same-component attractions, which make different base transition metals difficult to combine or alloy in a dispersed manner. Likewise metal oxides can be difficult to combine. Those skilled in the art are familiar with atoms and molecules that are difficult or impossible to combine or alloy due to dissimilarities in the two components.

3. Dispersing Agents

One or more types of dispersing agents are selected to promote the formation of multicomponent nanoparticles that have a desired composition or distribution. Dispersing agents within the scope of the invention include a variety of organic molecules, polymers, and oligomers. The dispersing agent comprises individual molecules that mediate in the formation of the multicomponent nanoparticles.

In general, useful dispersing agents include organic compounds that can form a complex with the component atoms or molecules used to make nanoparticles in the presence of an appropriate solvent or carrier, and optionally promoters and/or support materials. The dispersing agent is able to interact and complex with particle component atoms or molecules that are dissolved or dispersed within an appropriate solvent or carrier through various mechanisms, including ionic bonding, covalent bonding, van der Waals interaction, hydrogen bonding, or coordination bonding involving non-bonding electron pairs.

To provide the interaction between the dispersing agent and the particle component atoms or molecules, the dispersing agent includes one or more appropriate functional groups. In one embodiment, the functional groups comprise a carbon atom bonded to at least one electron-rich atom that is more electronegative than the carbon atom and that is able to donate one or more electrons so as to form a bond or attraction with a particle component atom. Preferred dispersing agents include functional groups which have either a negative charge, one or more lone pairs of electrons, or a positive charge that can be used to complex or bond to a particle component atom. These functional groups allow the dispersing agent to have a strong binding interaction with dissolved particle component atoms or molecules, which, in the case of metals, are preferably in the form of positively charged ions in solution.

The dispersing agent may be a natural or synthetic compound. In the case where the nanoparticle component atoms are metals and the dispersing agent is an organic compound, the complex so formed is an organometallic complex.

In one embodiment, the functional groups of the dispersing agent comprise carboxyl groups, either alone or in combination with other types of functional groups. In other embodiments, the functional groups may include one or more of a hydroxyl, a carboxyl, a carbonyl, an amine, a thiol, an ester, an amide, a nitrile, a nitrogen with a free lone pair of electrons, a ketone, an aldehyde, a sulfonic acid, an acyl halide, a sulfonyl halide, and combinations of these. Examples of suitable dispersing agents include glycolic acid, oxalic acid, malic acid, maleic acid, citric acid, pectins, amino acids, celluloses, combinations of these, and salts of any of these.

Suitable polymers and oligomers within the scope of the invention include, but are not limited to, polyacrylates, polyvinylbenzoates, polyvinyl sulfate, polyvinyl sulfonates including sulfonated styrene, polybisphenol carbonates, polybenzimidizoles, polypyridine, sulfonated polyethylene terephthalate. Other suitable polymers include polyvinyl alcohol, polyethylene glycol, polypropylene glycol, and the like. The dispersing agent can also be an inorganic compound (e.g., silicon-based) or a salt of any of the foregoing.

It may be advantageous to provide an amount of dispersing agent so as to provide an excess of functional groups relative to the number of particle component atoms or molecules. Including an excess of functional groups helps ensure that all or substantially all of the particle component atoms or molecules are complexed by the dispersing agent, which is particularly beneficial in the case where at least one of the nanoparticle components is expensive, such as in the case of noble metals. Providing an excess of dispersing agent can also help ensure the availability of functional groups for bonding the nanoparticle complex to a support where a supported nanoparticle is desired. It is also believed that employing an excess of functional groups helps yield nanoparticles that are more evenly dispersed in the particle system. Excess dispersing agent molecules are believed to intervene and maintain spacing between dispersing agent molecules. The excess dispersing agent molecules can increase spacing and dispersion in a suspension as well as aid in spacing nanoparticles upon deposition to a support surface.

In addition to the foregoing, it may also be useful to express the molar ratio of dispersing agent to the particle component atoms in a nanoparticle suspension. In one embodiment, the molar ratio of dispersing agent molecules to particle component atoms is in the range of about 0.01:1 to about 40:1. Preferably, the molar ratio of dispersing agent molecules to particle component atoms is in a range of about 0.1:1 to about 35:1, most preferably in a range of about 0.5:1 to about 30:1.

In some cases, a more useful measurement is the molar ratio between dispersing agent functional groups and particle component atoms. For example, in the case of a divalent metal ion two molar equivalents of a monovalent functional group would be necessary to provide a theoretical stiochiometric ratio. It may be desirable to provide an excess of dispersing agent functional groups to (1) ensure that all or substantially all of the particle component atoms are complexed, (2) bond the nanoparticles to a support, and (3) help keep the nanoparticles segregated so that they do not clump or agglomerate together. In general, it will be preferable to include a molar ratio of dispersing agent functional groups to particle component atoms in a range of about 0.5:1 to about 40:1, more preferably in a range of about 1:1 to about 35:1, and most preferably in a range of about 3:1 to about 30:1.

As discussed below, the nanoparticles can be supported on a support surface. It is believed that when a support material is added to a suspension of nanoparticles, the dispersing agent acts to uniformly disperse the complexed component atoms and/or suspended nanoparticle complexes onto the support material.

In addition to the foregoing, the dispersing agent can be selected in order to act as an anchor between the nanoparticles and a support material or substrate. Preferably, the support substrate has a plurality of hydroxyl or other functional groups on the surface thereof which are able to chemically bond to one or more functional groups of the dispersing agent, such as by way of a condensation reaction. One or more additional functional groups of the dispersing agent are also bonded to one or more atoms within the nanoparticle, thereby anchoring the nanoparticle to the substrate.

While the dispersing agent has the ability to inhibit particle agglomeration in the absence of being anchored to a support, chemically bonding the nanoparticle to the substrate surface through the dispersing agent is an additional and particularly effective mechanism for preventing particle agglomeration since the nanoparticles thereby become fixed in space.

B. Solvents and Carriers

A solvent or carrier may be used as a vehicle for the particle component atoms (typically in the form of an ionic salt) and/or the dispersing agent. The solvent may be an organic solvent, water or a combination thereof. Organic solvents that can be used include alcohols, ethers, glycols, ketones, aldehydes, nitriles, and the like. Preferred solvents are liquids with sufficient polarity to dissolve the metal salts. They include water, methanol, ethanol, normal and isopropanol, acetonitrile, acetone, tetrahydrofuran, ethylene glycol, dimethylformamide, dimethylsulfoxide, methylene chloride, and mixtures thereof.

Other chemical modifiers may also be included in the liquid mixture. For example, acids or bases may be added to adjust the pH of the mixture. Surfactants may be added to adjust the surface tension of the mixture, or to stabilize the nanoparticles.

The solvent for the nanoparticle components may be a neat solvent, but it is preferable to include an acid to yield an acidic solution, as acids aid in the dissolution of the nanoparticle components. The solvent solution may be acidified with any suitable acid, including organic and inorganic acids. Preferred acids include mineral acids such as sulfuric, phosphoric, hydrochloric, nitric, and the like, or combinations thereof. While it is possible to use an acid in a wide range of concentrations, it is generally only necessary to use relatively dilute solutions to accomplish the desired solubility enhancement. Moreover, concentrated acid solutions may present added hazard and expense. Thus, dilute acid solutions are currently preferred.

C. Supports and Support Materials

As discussed above, it is within the scope of the invention for the nanoparticles to be isolated on a support surface. The support material may be organic or inorganic. According to one embodiment, the supported nanoparticles may function as a catalyst. In the case of a supported catalyst, the support material can be chemically inert in the chemical reaction environment, or the support material may itself serve a catalytic function complementary to the function of the supported nanocatalyst particles.

Any solid support material known to those skilled in the art as useful nanoparticle supports can be used as supports for the dispersed nanoparticles of the present invention. The support may be selected from a variety of physical forms. Exemplary supports may be porous or non-porous. They may be 3-dimensional structures, such as a powder, granule, tablet, extrudate, or the like. Supports may be in the form of 2-dimensional structures, such as a film, membrane, coatings, or the like. It is even conceivable for the support to be a 1-dimensional structure, such as ultra thin fibers or filaments.

A variety of materials, alone or in combination, can comprise the support. One exemplary class of support materials preferred for some applications includes porous inorganic materials. These include, but are not limited to, alumina, silica, silica gel, titania, kieselguhr, diatomaceous earth, bentonite, clay, zirconia, magnesia, as well as the oxides of various other metals, alone or in combination. They also include the class of porous solids collectively known as zeolites, natural or synthetic, which have ordered porous structures.

Another useful class of exemplary supports includes carbon-based materials, such as carbon black, activated carbon, graphite, fluoridated carbon, and the like. Other useful classes of support materials include organic solids (e.g., polymers), metals and metal alloys.

In the case where the nanoparticles are attached to a support, the nanoparticles can be deposited in a wide range of loadings on the support material. The loading can range from 0.01% to 90% by weight of the total weight of the supported nanoparticles. The preferred loading will depend on the application. In the case where porous solids are used as the support material, it is preferred that the surface area of the support be at least 20 $m^2/g$, and more preferably more than 50 $m^2/g$.

Distribution of Components Within the Nanoparticles

At least a portion of the nanoparticles within a preparation of nanoparticles manufactured according to the invention will include two or more (e.g.,both) of the nanoparticle components. In a preferred embodiment, at least about 50% of the nanoparticles include two or more of the nanoparticle components. More preferably, at least about 75% of the nanoparticles within the preparation include two or more of the nanoparticle components, even more preferably at least about 85% of the nanoparticles include two or more of the nanoparticle components, and most preferably at least about 95% of the nanoparticles within the preparation include two or more of the nanoparticle components. It is within the scope of the invention for at least about 99% (i.e., essentially all) of the nanoparticles within a preparation according to the invention to include two or more of the nanoparticle components.

Because a substantial proportion of the nanoparticles prepared according to the invention include two or more nanoparticle components, the benefits derived from having the components in a single particle are more uniformly distributed throughout the nanoparticles compared to heterogeneous mixtures of homogeneous particles. Consequently, the overall nanoparticle material or catalyst has an increased display of these beneficial properties.

According to another aspect of the invention, the degree of dispersion of the two or more components within nanoparticles prepared according to the invention can be measured by the Number Ratio (NR) or Range of NR for a given set of nanoparticles having two or more components. As mentioned above, the Number Ratio=$N_A/N_B$, where $N_A$ is the number (or moles) of atoms of a more numerous component A within a nanoparticle or set of nanoparticles according to the invention, and $N_B$ is the number (or moles) of atoms of a less numerous component B within the nanoparticle or set of nanoparticles. The value of NR can be expressed as an average value ($NR_{avg}$) for all of the nanoparticles in a given set or as the specific value ($NR_i$) for a particular nanoparticle i.

In an ideal case, the value $NR_i$ for each nanoparticle i in a given set of inventive nanoparticles equals $NR_{avg}$. In this case, each particle i has an equal distribution of components A and B. The present invention also contemplates controlling the dispersion of components in bi- or multi-component nanoparticles such that the Range of NR values for all of the nanoparticles in a particular sample is within a desired range. As mentioned above, the Range of NR has an upper value $NR_{max}$ and a lower value $NR_{min}$. As $NR_{max}$ and $NR_{min}$ deviate less from $NR_{avg}$, the Range of NR becomes narrower, which indicates that the nanoparticles are more uniform.

In a preferred embodiment, the value of $NR_{max}$ does not exceed about 5 times the value of $NR_{avg}$, more preferably does not exceed about 3 times the value of $NR_{avg}$, and most preferably does not exceed about 2 times the value of $NR_{avg}$.

Conversely, the value of $NR_{min}$ is preferably at least about 0.2 times the value of $NR_{avg}$, more preferably at least about 0.33 times the value of $NR_{avg}$, and most preferably at least about 0.5 times the value of $NR_{avg}$.

Given the foregoing, the Range of NR is therefore preferably about 0.2 to about 5 times the value of $NR_{avg}$, more preferably about 0.33 to about 3 times the value of $NR_{avg}$, and most preferably about 0.5 to about 2 times the value of $NR_{avg}$. It will be appreciated that the foregoing ranges do not count "outliers" (i.e., particles that do not form correctly and that excessively deviate from $NR_{avg}$ as to be outside the Range of NR). Whereas the NR of the "outliers" may in some cases count toward the $NR_{avg}$, they do not fall within the "Range of NR" by definition.

In a preferred embodiment, at least about 50% of the individual nanoparticles in a given preparation will have an $NR_i$ within the Range of NR. More preferably, at least about 75% of the individual nanoparticles within the preparation will have an $NR_i$ within the Range of NR, even more preferably at least about 85% of the individual nanoparticles within the preparation will have an $NR_i$ within the Range of NR, and most preferably at least about 95% of the individual nanoparticles within the preparation will have an $NR^i$ within the Range of NR. It is within the scope of the invention for at least about 99% of the individual nanoparticles within a preparation according to the invention to have an $NR_i$ within the Range of NR.

In contrast to the relatively narrow Range of NR for nanoparticles made according to the present invention, nanoparticles in the art, to the extent they can be made as all, have very wide Ranges of $NR_i$, in some cases ranging from zero to infinity, indicating that some particles have essentially none of one component, and other particles have essentially none of the other component.

The following two simple numerical examples provide non-limiting examples of nanoparticles of the present invention having desired Ranges of NR. Consider a case where component B comprises 1% of a bimetallic nanoparticle mixture, and component A comprises the balance in a given set of nanoparticles. In this, case the $NR_{avg}$ for the set of nanoparticles is approximately 100. The preferred Range of NR for the set nanoparticles is thus 20 to 500, which translates to a range of 0.2% to 5% of component B in the individual nanoparticles that contain both components. The more preferred range for NR is 33 to 300, translating to a composition range of 0.33% to 3% of component B in the individual nanoparticles that contain both components. The most preferred range for $NR_i$ is 50 to 200, or a composition range of 0.5% to 2% component B in the individual nanoparticles that contain both components.

In a second simple numerical example, consider a case where component A and component B are each present in equal quantities of 50% of the total, such that the overall $NR_{avg}$ is 1. In this case, the preferred range of $NR_i$ is 0.2 to 5, corresponding to a composition range of 16% to 83% of component B in the individual nanoparticles that contain both components. The more preferred range of $NR_i$ is 0.33 to 3, corresponding to a composition range of 25% to 75% component B in the individual nanoparticles that contain both components. Finally, the most preferred range of $NR_i$ is 0.5 to 2, or a composition range of 33% to 67% component B in the individual nanoparticles that contain both components.

As discussed above, the dispersing agents according to the present invention are used to provide the desired dispersion and uniformity that is characteristic of the nanoparticles of the present invention. Using the dispersing agents according to the present invention, the above-mentioned uniformity as defined by the Range of NR can be obtained.

In one embodiment, the dispersing agent remains as a constituent of the nanoparticles. The inventors of the present invention have found by infrared spectroscopy that characteristic features attributable to the dispersing agent can be present in the final nanoparticle product indicating that the dispersing agent persists beyond the nanoparticle production steps. In one embodiment, the dispersing agent is believed to be a stabilizing component in the final catalyst or nanoparticle material. For example, the dispersing agent can provide a desirable anchoring effect of the particle to a support which prevents migration and agglomeration of nanoparticles, even under relatively severe operating conditions. However, even where the dispersing agent is not used as an anchor to a support material (e.g., in the absence of a support material or where the dispersing agent does not bond to the support material), the dispersing agent can have a stabilizing effect.

While it is possible that the multicomponent nanoparticles may contain a true multicomponent compound, alloy, or crystal structure in which the components are in an ordered arrangement, this is not required. In one embodiment, each nanoparticle can be composed of a mixture of components regardless of how they are combined or arranged. The components can be present as relatively isolated atoms, as small atomic clusters, or decorated. They can also be present as amorphous particles. The components can be present as crystallites including alloys. Component crystals can have relatively random crystal face exposures; or they can have a controlled or selective exposure of particular crystal faces.

The statistical distribution or uniformity made possible by the dispersing agent of the present invention allows for nanocatalysts and nanomaterials with new and/or improved materials and/or catalytic properties. Maximizing multicomponent catalyst and nanomaterial properties may depend on the proximity of the two components. The substantially uniform distribution of components between and among nanoparticles provides a greater possibility for different components to come into proximity with one another to provide a desired functionality or property.

The dispersing agent also makes it possible to select very precise ratios of components by controlling the average percent composition. Because the individual multicomponent nanoparticles have a percent composition that varies very little from the average composition, the percent composition of the individual nanoparticles can be more precisely controlled by adjusting the starting materials to control the average percent composition.

III. Methods of Making Multicomponent Nanoparticles

General processes for manufacturing multicomponent nanoparticles according to the invention can be broadly summarized as follows. Two or more types of particle atoms and one or more types of dispersing agents are selected. The particle atoms and the dispersing agent are reacted or combined together to form a plurality of component complexes (collectively referred to as the "component complex"). The component complex is generally formed by first dissolving the particle atoms and dispersing agent(s) in an appropriate solvent or carrier and then allowing the dispersing agent to recombine the dissolved component atoms as the component complex so as to form a solution or suspension. In one embodiment, multicomponent nanoparticles form in the suspension. Alternatively, nanoparticles may form upon or after the component complex is disposed on a support surface. If desired, at least a portion of the dispersing agent can be removed to expose the multicomponent nanoparticles. The dispersing agent may form a chemical bond with the support material in order to thereby anchor the nanoparticles to the support.

A more specific example for making multicomponent nanoparticles according to the invention includes providing two or more types of particle component atoms in solution (e.g., in the form of an ionic salt), providing a dispersing agent in solution (e.g., in the form of a carboxylic acid salt), and reacting the particle component atoms with the dispersing agent to form a component complex (i.e., a solution, suspension or colloid of component atoms complexed with the dispersing agent). The particle component atoms can be provided in any form so as to be soluble or dispersible in the solvent or carrier that is used to form the component complex. In the case where the particle component atoms comprise one or more metals, salts of these metals can be formed that are readily soluble in the solvent or carrier. In the case where the component atoms include noble metals, it may be advantageous to use noble metal chlorides and nitrates, since chlorides and nitrate of noble metals are more readily soluble than other salts. Chloride and nitrates of other metal particle atoms, such as base transition metals and rare earth metals may likewise be used, since chlorides and nitrates are typically more soluble than other types of salts.

The component atoms can be added to the solvent or carrier singly or in combination to provide final nanoparticles that comprise mixtures of various types of particle atoms. For example, a bimetallic iron/platinum catalyst can be formed by first forming a precursor solution into which is dissolved an iron salt, such as iron chloride, and a platinum salt, such as chloroplatinic acid. In general, the composition of the final nanoparticles will be determined by the types of particle component atoms used to form the component complex. Therefore, control of the amounts of component atoms added to the solution, colloid or suspension provides a convenient method for controlling the relative concentrations of the different types of component atoms in the final multicomponent nanoparticles.

The dispersing agent is added to the solvent or carrier in a manner so as to facilitate association with the particle component atoms in order to form the component complex. Some dispersing agents may themselves be soluble in the solvent or carrier. In the case of dispersing agents that include carboxylic acid groups, it may be advantageous to form a metal salt of the acids (e.g., an alkali or alkaline earth metal salt). For example, polyacrylic acid can be provided as a sodium polyacrylate salt, which is both readily soluble in aqueous solvent systems and able to react with catalyst metal salts to form a metal-polyacrylate complex, which may be soluble or which may form a colloidal suspension within the solvent or carrier.

In general, component complexes according to the invention comprise the particle atoms and dispersing agent, exclusive of the surrounding solvent or carrier. Therefore, it is within the scope of the invention to create a component complex in solution, or as a colloid or suspension, and then remove the solvent or carrier so as to yield a dried component complex. The dried component complex can be used in this form, or it can be reconstituted as a solution, colloid or suspension by adding an appropriate solvent.

In the case where the nanoparticles of the invention are to be formed on a solid support material, the component complex solution is physically contacted with the solid support. Contacting the component complex with the solid support is typically accomplished by means of an appropriate solvent within the component complex solution, colloid or suspension in order to apply or impregnate the component complex onto the support surface.

Depending on the physical form of the support material, the process of contacting or applying the component complex to the support may be accomplished by a variety of methods. For example, the support may be submerged or dipped into a solution, colloid, or suspension comprising a solvent or carrier and the component complex. Alternatively, the solution, colloid, or suspension may be sprayed, poured, painted, or otherwise applied to the support material. Thereafter, the solvent or carrier is removed, optionally in connection with a reaction step that causes the dispersing agent to become chemically bonded or adhered to the support.

If desired, at least a portion of the nanoparticles can be exposed by removing a at least a portion of the dispersing agent, such as by reduction (e.g., hydrogenation) or oxidation. Hydrogen is one preferred reducing agent. Instead of, or in addition to, using hydrogen as the reducing agent, a variety of other reducing agents may be used, including lithium aluminum hydride, sodium hydride, sodium borohydride, sodium bisulfite, sodium thiosulfate, hydroquinone, methanol, aldehydes, and the like. The reduction process may be conducted at a temperature between 20° C. and 500° C., and preferably between 100° C. and 400° C.

In some cases, such as where it is desired for a portion of the dispersing agent to remain as an anchoring agent, oxidation may only be suitable when the particle atoms do not include noble metals, since noble metals might catalyze the oxidation of the entire dispersing agent, leaving none for anchoring. In such cases, oxidation may be more suitable, for example, in the case where the particle atoms comprise transition metals and the support is non-combustible (e.g., silica or alumina rather than carbon black, graphite or polymer membranes). According to an exemplary embodiment, oxidation may be carried out using oxygen, hydrogen peroxide, organic peroxides, and the like.

In one embodiment, the process of removing the dispersing agent to expose the particle atoms is carefully controlled to ensure that enough of the dispersing agent remains so as to reliably maintain a dispersed catalyst. Removing the dispersing agent to the extent that little or none of it remains to disperse or anchor the nanoparticles has been found to reduce the stability of the nanoparticles, particularly when the catalyst is subjected to harsh reaction conditions during use. Nevertheless, it is within the scope of the invention to remove all or substantially all of the dispersing agent in order to yield free multicomponent nanoparticles that are neither anchored to a support or otherwise complexed with a dispersing agent to any degree.

Supported nanoparticles can be optionally heat-treated to further activate the nanoparticles. It has been found that, in some cases, subjecting the nanoparticles to a heat treatment process before initially using the nanoparticles causes the nanoparticles to be more active initially. The step of heat treating the nanoparticles may be referred to as "calcining" because it may act to volatilize certain components within the nanoparticles. The heat treatment process may be carried in inert, oxidizing, or reducing atmospheres.

In some cases it may be desirable to maintain at least some of the nanoparticle components in a non-zero oxidation state during the heat treatment process in order to increase the bond strength between the dispersing agent and the nanoparticles. Increasing the bond between the dispersing agent and the nanoparticles is believed to increase the dispersion of the nanoparticles and/or the distribution of components within the particles by reducing the tendency of nanoparticles to migrate and/or agglomerate together when exposed to higher temperatures. This is particularly true in the case of supported multicomponent nanoparticles.

Where the nanoparticles are subjected to a heat treatment process, the process is preferably carried out at a temperature in a range of about 50° C. to about 300° C., more preferably in a range of about 100° C. to about 250° C., and most preferably in a range of about 125° C. to about 200° C. The duration of the heat treatment process is preferably in a range of about 30 minutes to about 12 hours, more preferably in a range of about 1 hour to about 5 hours.

An important feature of the heat treating step according to the present invention is that it does not degrade the nanoparticles or reduce catalytic activity. The dispersing agent provides the stability needed to subject the nanoparticles to higher temperatures without destroying or partially destroying the nanoparticles. Further stability may be possible where the particle component atoms are bonded to the dispersing agent and then maintained in a non zero-oxidation state, which enhances the bond between the component atoms and the active complexing groups of the dispersing agent.

The following exemplary procedures where used to prepare iron-platinum multicomponent nanoparticles according to the invention. By showing that iron and platinum can be compounded together to form heterogeneous multicomponent nanoparticles, the examples demonstrate that two very dissimilar materials having very strong same-component attractions can, in fact, be compounded together using a dispersing agent. From this it may be expected that any two or more dissimilar materials can be compounded together using the compositions and methods described herein.

EXAMPLE 1

Nanoparticle Suspension

An Iron (III) solution was prepared by dissolving 2.32 g of $FeCl_3$ in 4 ml HCl and 996 ml de-ionized water to produce a 0.08 wt % solution of Fe (III). A Pt solution was prepared by dissolving 0.2614 g $H_2PtCl_6$ (from Strem Chemicals) in 1000 ml de-ionized water to make 0.01 wt % solution of Pt. To make a 6.75 wt % solution of polyacrylate, 15 g of a 45 wt % poly acrylate solution (Aldrich with MW ca. 1,200) was diluted to 100 grams with de-ionized water.

To prepare 2.4 grams of a 10% Fe and 0.2% Pt supported nanoparticles, 300 ml of the 0.08 wt % Fe solution was mixed with 48 ml of the 0.010 wt % Pt solution and 40 ml of the 6.75 wt % polyacrylate solution. The ratio of Fe:polyacrylate was 1:1. The solution was then diluted to 4000 ml with de-ionized water. This solution was purged by 100 ml/min $N_2$ for 1 hour. Then the $N_2$ was replaced with 130 ml/min $H_2$ for 16 minutes. The flask was then held overnight. The Fe—Pt solution resulted in the formation of a suspension of nanoparticles.

EXAMPLE 2

Supported nanoparticles were prepared by first preparing a solution of Fe—Pt particles according to Example 1. 24 g of Black Pearls 700 were impregnated by 4000 ml of the Fe—Pt solution or suspension prepared according to Example 1. The slurry was heated by an IR lamp under rotation until all the liquid was evaporated. The obtained samples were kept in an oven at 100° C. The sample was packed in a reduction unit between two layers of glass-wool. The sample was then treated by the following procedure: purged by 100 ml/min $N_2$ for 15 minute and then with 100 ml/min $H_2$ at the following temperatures and for the following amount of time: 25° C. (0.5 h), then 90° C. (2 h), then 90° C. (2 h), then 300° C. (17 h). The sample was then cooled to room temperature in 100 ml/min $H_2$. It was then purged by 100 ml/min of $N_2$ for one hour.

EXAMPLE 3

8.13 g $FeCl_3$ was mixed with 16.5 g 70 wt % glycolic acid and diluted with water to 100 g. After overnight agitation, the $FeCl_3$ was totally dissolved. To this solution 2.8 g 0.01 wt % Pt solution from Example 1 was added. This solution was used to impregnate 140 g $CaCO_3$. After the same drying and activation procedure as for Example 1, an alloy sample with 2%Fe and 0.02%Pt was formed.

The multicomponent nanoparticle materials produced in examples 1, 2, and 3 had nanoparticles in which essentially all the nanoparticles included both iron and platinum, which would be virtually thermodynamically impossible using heat compounding techniques.

EXAMPLE 4

Any of Examples 1-3 is modified in order to compound together two or more dissimilar components in which at least one of the components is selected from one of the following groups and at least one other of the components is selected from another of the following groups: noble metals, base transition metals, alkali metals, alkaline earth metals, rare earth metals, and nonmetals.

The dispersing agent may be one or more of any of the dispersing agents described herein. A substantial portion of the nanoparticles manufactured thereby include two or more dissimilar components in each of the nanoparticles.

EXAMPLE 5

Any of Examples 1-3 is modified in order to compound together two or more dissimilar components in which at least one of the components is selected from one group of the periodic table of elements and at least one other of the components is selected from another group of the periodic table of elements.

The dispersing agent may be one or more of any of the dispersing agents described herein. A substantial portion of the nanoparticles manufactured thereby include two or more dissimilar components in each of the nanoparticles.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. j

What is claimed is:

1. A method of manufacturing a multicomponent nanoparticle material, comprising:
   preparing an aqueous mixture comprised of:
      a first plurality of nanoparticle atoms selected from a first group of the periodic table of elements;
      a second plurality of nanoparticle atoms selected from a second group of the periodic table of elements different from the first group;
   mixing the aqueous mixture with a polyfunctional dispersing agent in order to form an intermediate multicomponent complex with atoms of the first plurality of nanoparticle atoms and atoms of the second plurality of nanoparticle atoms within an aqueous solvent or carrier, the polyfunctional dispersing agent including individual molecules having at least two functional groups selected from the group consisting of functional groups having a negative charge and functional groups having one or more lone pairs of electrons, the polyfunctional dispersing agent at least partially determining an arrangement of the first and second nanoparticle atoms in the intermediate mutlicomponent complex;
   wherein the polyfunctional dispersing agent is selected from the group consisting of pectins, amino acids, celluloses, glycolic acid, oxalic acid, malic acid, citric acid, polyacrylates, polyvinylbenzoates, poly vinyl sulfate, polyvinyl sulfonates including sulfonated styrene, polybisphenol carbonates, polybenzimidizoles, polypyridine, sulfonated polyethylene terephthalate, polyvinyl alcohol, polyethylene glycol, polypropylene glycol, and combinations thereof;
   causing or allowing the intermediate multicomponent complex to form intermediate multicomponent nanoparticles bound to or associated with the polyfunctional dispersing agent; and
   removing at least a portion of the polyfunctional dispersing agent from the intermediate multicomponent nanoparticles by at least one of reduction or oxidation in order to yield the multicomponent nanoparticle material,
   the multicomponent nanoparticle material comprising multicomponent nanoparticles that include the first and second nanoparticle atoms within each multicomponent nanoparticle and have a size less than about 100 nm.

2. A method according to claim 1, further comprising placing the intermediate multicomponent complex and/or intermediate multicomponent nanoparticles onto a support material prior to removing at least a portion of the polyfunctional dispersing agent from the intermediate multicomponent nanoparticles by at least one of reduction or oxidation.

3. A method of manufacturing a multicomponent nanoparticle material, comprising:
   preparing an aqueous mixture comprised of:
      a first plurality of nanoparticle atoms selected from the group consisting of noble metals, base transition metals, alkaline earth metals, and rare earth metals;
      a second plurality of nanoparticle atoms being selected from a different member of the group consisting of noble metals, base transition metals, alkaline earth metals, and rare earth metals than the first plurality of nanoparticle atoms;
   mixing the aqueous mixture with a polyfunctional dispersing agent in order to form an intermediate multicomponent complex with atoms of the first plurality of nanoparticle atoms and atoms of the second plurality of nanoparticle atoms within an aqueous solvent or carrier, the polyfunctional dispersing agent including individual molecules having at least two functional groups selected from the group consisting of functional groups having a negative charge and functional groups having one or more lone pairs of electrons, the polyfunctional dispersing agent at least partially determining an arrangement of the first and second nanoparticle atoms in the intermediate multicomponent complex;
   wherein the polyfunctional dispersing agent is selected from the group consisting of pectins, amino acids, celluloses, glycolic acid, oxalic acid, malic acid, citric acid, polyacrylates, polyvinylbenzoates, polyvinyl sulfate, polyvinyl sulfonates including sulfonated styrene, polybisphenol carbonates, polybenzimidizoles, polypyridine, sulfonated polyethylene terephthalate, polyvinyl alcohol, polyethylene glycol, polypropylene glycol, and combinations thereof;
   causing or allowing the intermediate multicomponent complex to form intermediate multicomponent nanoparticles bound to or associated with the polyfunctional dispersing agent;
   removing at least a portion of the polyfunctional dispersing agent from the intermediate multicomponent nanoparticles by at least one of reduction or oxidation in order to yield the multicomponent nanoparticle material,
   the multicomponent nanoparticle material comprises multicomponent nanoparticles that include the first and second nanoparticle atoms within each multicomponent nanoparticle and have a size less than about 100 nm.

4. A method according to claim 1, the polyfunctional dispersing agent providing an excess of functional groups relative to the combined number of first and second nanoparticle atoms.

5. The method according to claim 1, wherein at least about 75% of the multicomponent nanoparticle material is composed of multicomponent nanoparticles.

6. The method according to claim 1, wherein at least about 85% of the multicomponent nanoparticle material is composed of multicomponent nanoparticles.

7. The method according to claim 1, wherein at least about 95% of the multicomponent nanoparticle material is composed of multicomponent nanoparticles.

8. The method according to claim 1, wherein at least about 99% of the multicomponent nanoparticle material is composed of multicomponent nanoparticles.

9. A method according to claim 1, wherein the multicomponent nanoparticles have a degree of dispersion of the first and second nanoparticle atoms measured by a Range of NR (number ratio) that is about 0.2 to about 5 times the value of $NR_{avg}$.

10. A method according to claim 1, wherein the multicomponent nanoparticles have a degree of dispersion of the first and second nanoparticle atoms measured by a Range of NR (number ratio) that is about 0.33 to about 3 times the value of $NR_{avg}$.

11. A method according to claim 1, wherein the multicomponent nanoparticles have a degree of dispersion of the first and second nanoparticle atoms measured by a Range of NR (number ratio) that is about 0.5 to about 2 times the value of $NR_{avg}$.

12. A method according to claim 1, wherein the first and second nanoparticle atoms are alloyed together within the multicomponent nanoparticles.

13. A method according to claim 1, further comprising placing the intermediate multicomponent complex and/or intermediate multicomponent nanoparticles onto a support material prior to removing at least a portion of the polyfunctional dispersing agent from the intermediate multicomponent nanoparticles by at least one of reduction or oxidation.

14. A method according to claim 1, wherein the multicomponent nanoparticles are less than about 20 nm in diameter.

15. A method according to claim 1, wherein the multicomponent nanoparticles are less than about 6 nm in diameter.

16. A method according to claim 1, wherein the multicomponent nanoparticles are catalytically active.

17. A method of manufacturing a multicomponent nanoparticle material, comprising:
 preparing an aqueous mixture comprised of:
  a first plurality of nanoparticle atoms selected from the group consisting of noble metals, base transition metals, alkaline earth metals, and rare earth metals;
  a second plurality of nanoparticle atoms being selected from a different member of the group consisting of noble metals, base transition metals, alkaline earth metals, and rare earth metals than the first plurality of nanoparticle atoms;
 mixing the aqueous mixture with a polyfunctional dispersing agent in order to form an intermediate multicomponent complex with atoms of the first plurality of nanoparticle atoms and atoms of the second plurality of nanoparticle atoms within an aqueous solvent or carrier, the polyfunctional dispersing agent including individual molecules having at least two functional groups selected from the group consisting of functional groups having a negative charge and functional groups having one or more lone pairs of electrons, the polyfunctional dispersing agent at least partially determining an arrangement of the first and second nanoparticle atoms in the intermediate multicomponent complex;
 wherein the polyfunctional dispersing agent is selected from the group consisting of pectins, amino acids, celluloses, glycolic acid, oxalic acid, malic acid, citric acid, polyacrylates, polyvinylbenzoates, polyvinyl sulfate, polyvinyl sulfonates including sulfonated styrene, polybisphenol carbonates, polybenzimidizoles, polypyridine, sulfonated polyethylene terephthalate, polyvinyl alcohol, polyethylene glycol, polypropylene glycol, and combinations thereof;
 causing or allowing the intermediate multicomponent complex to form intermediate multicomponent nanoparticles bound to or associated with the polyfunctional dispersing agent;
 placing the intermediate multicomponent nanoparticles onto a support material; and
 removing at least a portion of the polyfunctional dispersing agent from the intermediate multicomponent nanoparticles by at least one of reduction or oxidation in order to yield the multicomponent nanoparticle material,
 the multicomponent nanoparticle material comprises multicomponent nanoparticles that include the first and second nanoparticle atoms within each multicomponent nanoparticle and have a size less than about 100 nm.

18. A method according to claim 17, the support material being comprised of at least one of a powder, granule, tablet, or extrudate.

19. A method according to claim 17, wherein at least about 95% of the multicomponent nanoparticle material is composed of multicomponent nanoparticles.

* * * * *

UNITED STATES PATENT AND TRADEMARK OFFICE
CERTIFICATE OF CORRECTION

PATENT NO. : 7,709,411 B2  Page 1 of 2
APPLICATION NO. : 12/421208
DATED : May 4, 2010
INVENTOR(S) : Zhou et al.

It is certified that error appears in the above-identified patent and that said Letters Patent is hereby corrected as shown below:

Title Page, Item 56, Page 1, References Cited, OTHER PUBLICATIONS, change the reference "Zhang et al. "Microemulsion synthesis and elctrocatalytic properties of platinum-cobalt nanoparticles", Journal of Materials Chemistry, 2002, 12, 1203-1206." to --Zhang et al. "Microemulsion synthesis and electrocatalytic properties of platinum-cobalt nanoparticles", Journal of Materials Chemistry, 2002, 12, 1203-1206.--

Title Page, Item 56, Page 3, References Cited, OTHER PUBLICATIONS, change the reference "Sun et al., "Monodisperse FePt Nanoparticles and Ferromagnetic FePt Nanycrystal Superlattices", Mar. 17, 2000, Science, vol. 287, pp. 1989-1992." to --Sun et al., "Monodisperse FePt Nanoparticles and Ferromagnetic FePt Nanocrystal Superlattices", Mar. 17, 2000, Science, vol. 287, pp. 1989-1992.--

Column 2
Line 23, change "causes" to --cause--

Column 3
Line 59, change "cases" to --cases,--

Column 5
Line 40, after "sample" remove [of]

Column 9
Line 1, change "stiochiometric" to --stoichiometric--

Column 10
Line 39, before "Distribution of Components Within the Nanoparticles" insert --D.--

Column 11
Line 46, change "$NR^i$" to --$NR_i$--

Column 13
Line 42, change "nitrate" to --nitrates--

Signed and Sealed this

Twenty-third Day of November, 2010

David J. Kappos
*Director of the United States Patent and Trademark Office*

Column 14
Line 35, after "removing" remove [a]

Column 15
Line 42, change "where" to --were--
Line 66, change "Fe solution" to --Fe (III) solution--

Column 16
Line 19, change "minute" to --minutes--
Line 20, change "amount" to --amounts--
Line 66, change "include" to --includes--

Column 17
Line 8, after "scope." remove [j]
Lines 14-15, change "a first group of the periodic table of elements;" to --the group consisting of noble metals, base transition metals, alkaline earth metals, and rare earth metals;--
Line 16-18, change "selected from a second group of the periodic table of elements different from the first group;" to --being selected from a different member of the group consisting of noble metals, base transition metals, alkaline earth metals, and rare earth metals than the first plurality of nanoparticle atoms;--

Column 18
Line 29, change "dispersing agent;" to --dispersing agent; and--
Line 35, change "comprises" to --comprising--